United States Patent [19]

Haendle et al.

[11] Patent Number: 4,926,454

[45] Date of Patent: May 15, 1990

[54] X-RAY DIAGNOSTIC APPARATUS

[75] Inventors: Joerg Haendle, Erlangen; Wolfgang Maass, deceased, late of Nuremberg, Fed. Rep. of Germany, by Dora Maass, Peter Maass, heirs

[73] Assignee: Siemens Aktiengesellschaft, Berlin and Munich, Fed. Rep. of Germany

[21] Appl. No.: 744,161

[22] Filed: Jun. 12, 1985

[30] Foreign Application Priority Data

Jun. 20, 1984 [DE] Fed. Rep. of Germany ....... 3422875

[51] Int. Cl.$^5$ ............................................. H05G 1/64
[52] U.S. Cl. ..................................... 378/100; 378/99; 358/111
[58] Field of Search .......................... 378/99, 100, 111; 358/111

[56] References Cited

U.S. PATENT DOCUMENTS

| 4,398,213 | 8/1983 | Haendle et al. | 378/99 |
| 4,536,790 | 8/1985 | Kruger et al. | 378/99 |
| 4,581,635 | 4/1986 | Franke | 378/99 |

Primary Examiner—Carolyn E. Fields
Assistant Examiner—David P. Parta
Attorney, Agent, or Firm—Mark H. Jay

[57] ABSTRACT

X-ray diagnostic apparatus is disclosed which includes a video camera; at least one image memory (12); one subtraction stage (13) for producing subtraction images by forming the difference from a stored video signal and a video signal chronologically following the stored video signal; an evaluation circuit (14 to 21) for evaluating the time of the difference signal; and a color video monitor (7). The evaluation circuit (14 to 21) contains a time stage (15) and a color converter (14). The color converter (14) is directly coupled to the subtraction stage (13) and converts the subtraction image into a black and white (monochrome) intensity image whose image color is controlled by the time stage (15) in dependence upon the chronological occurrence of the subtraction image. The color converter (14) has one output for each of the primary colors (red, green, blue). One memory (16 to 18) is coupled to each of these outputs for the storing of the output signals of the color converter (14) by summation.

1 Claim, 1 Drawing Sheet

X-RAY DIAGNOSTIC APPARATUS

BACKGROUND OF THE INVENTION

The invention relates to x-ray diagnostic apparatus utilizing a video camera; at least one image memory; a subtraction stage for producing a difference signal representing the difference between a stored video signal and a video signal which chronologically follows the stored video signal; an evaluation circuit for time evaluation of the difference signal; and a color video monitor for displaying the processed x-ray images. The evaluation circuit in this diagnostic apparatus contains a time stage and a color converter. Subtraction images are used for x-rays, especailly for selective angiography, to make clearly visible blood vessels that are difficult to recognize in a regular x-ray picture or are located behind bone structures.

The U.S. Pat. No. 4,398,213 discloses x-ray diagnostic apparatus in which an evaluation circuit recognizes the chronological occurrence of changes in the differential image and reads the respective pieces of time information received from a time phase into a time memory by means of a comparator. These pieces of time information consist of numerical values, and the magnitude of the stored numerical values characterizes the chronological occurrence of the maximum of the contrast medium flow. These numerical values are converted into video signals of different colors in a color converter coupled to the memory and are subsequently reproduced on the color monitor. The progression of the contrast medium can thus be observed on the monitor with respect to its location and chronological occurrence with the aid of this color image. For example, a blood vessel through which the contrast medium is flowing is shown in color, and the red image dots may signal an early point in time, while the blue image points represent the chronological end of the contrast medium flow. Thus the entire image with its colored time information pieces can be seen upon completion of the x-ray photography. However, misinformation with respect to the image points occurs with the use of a comparator for the detection of maxima in the difference signal, which leads to color disturbances in the color subtraction image due to quantum noise.

SUMMARY OF THE INVENTION

A principal object of the invention is to provide x-ray diagnostic apparatus of the type described above, which makes possible a dependable evaluation of the chronological progression of the contrast medium flow and in which disturbances, caused for example by quantum noise, are almost completely suppressed.

This object, as well as other objects which will become apparent from the discussion that follows, are achieved, according to the invention by (1) connecting the color converter directly to the difference stage to convert the difference image into a black and white (monochrome) intensity image with an image color that is controlled by the time stage in dependence on the chronological occurrence of the difference image; and (2) coupling a memory to each of the three primary color outputs of the color converter, to store the output signals of the color converter by summation. A color subtraction image, which indicates by its color the location and the chronological occurrence of the contrast medium, is produced by the addition of the individual monochromatic intensity images in the memories. Due to this interrogation over the entire progression of the contrast medium, individual disturbances within the images, produced by quantum noise, do not cause any interfering color spots that could impair the recognizability of the images.

For a full understanding of the present invention, reference should now be made to the following detailed description of the preferred embodiment of the invention and to the accompanying drawings.

DESCRIPTION OF THE PREFERRED EMBODIMENTS

Figure 1:
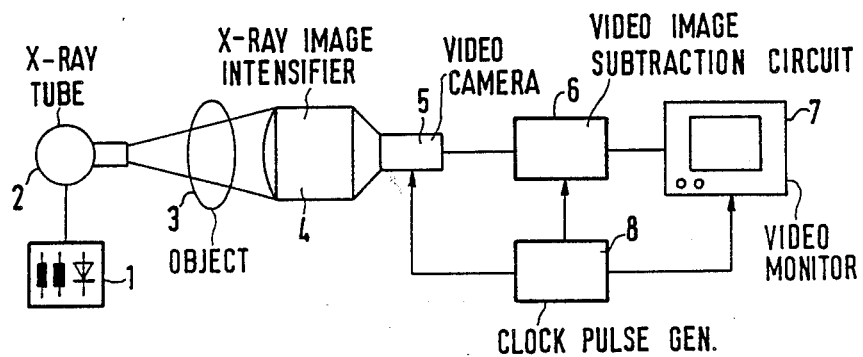
FIG. 1 is a block diagram of the x-ray diagnostic apparatus to which the invention relates.

FIG. 1 shows the x-ray diagnostic apparatus to which the invention relates having an x-ray tube 2 supplied by a highvoltage generator 1, and a patient 3 positioned in the path of the tube's rays. An x-ray picture converter 4 in the path of the rays behind the patient is coupled with a video camera 5, whose output leads to a subtraction circuit 6. The signal processed there is reproduced on a color video monitor 7. A clock pulse generator 8 synchronizes the chronological functions of the television camera 5, the subtraction circuit 6 and the color monitor 7.

Figure 2:
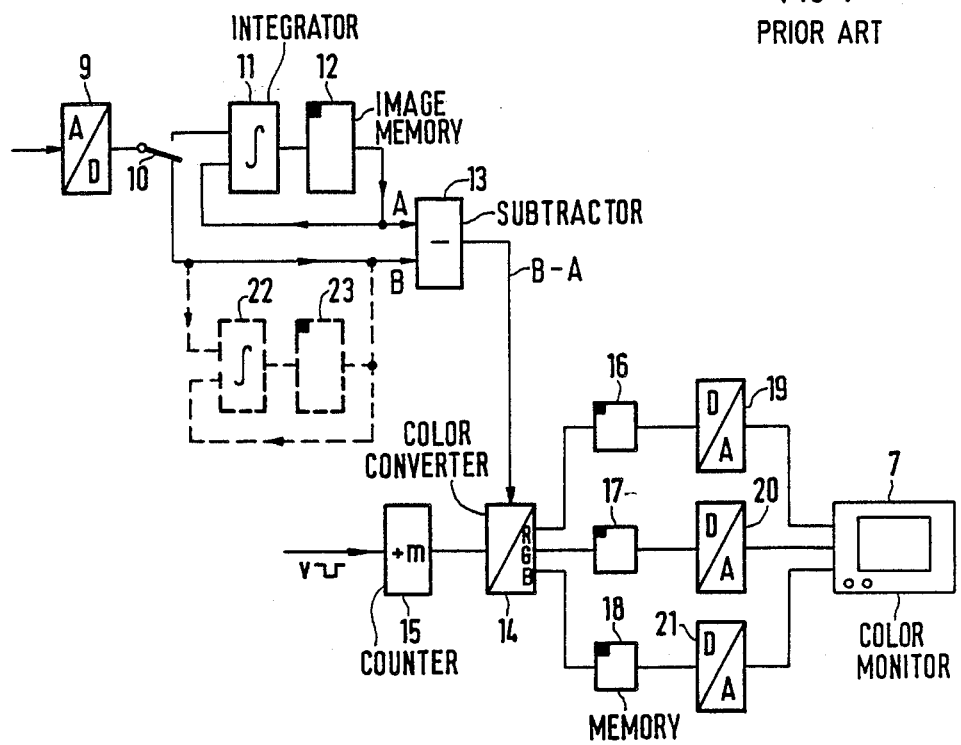
FIG. 2 is a block diagram of the subtraction and evaluation circuits of the x-ray diagnostic apparatus of FIG. 1.

The subtraction stage 6 is shown in detail in FIG. 2. As may be seen, the output video signal of the television camera 5 is initially separated into digital image points in an analog/digital (A/D) converter 9. The output of the A/D converter 9 is passed to a selection switch contact 10 that has one switch position leading to a first integration stage 11. The output of this integration stage is supplied into the input of the first image memory 12. The output of the first image memory 12 and the second switch position of the selection switch contact 10 are coupled to a difference stage 13 which subtracts the video signal A stored in the first image memory 12 from the actual video signal B that chronologically follows this stored signal.

The difference signal B-A formed by the subtractor 13 is supplied to one input of a color converter 14. The other input of the converter 14 is coupled to a time counter 15 which receives vertical sync pulses V from the video camera 5. The red output R of the color converter 14 is connected to a first memory 16, the green output G to a second memory 17, and the blue output B, to a third memory 18, which memories store output signals of the color converter 14 by summation. Output signals of the memories 16 to 18 are supplied to the color monitor 7 through separate digital/analog (D/A) converters 19 to 21, respectively.

The time counter 15 is set to zero at the start of the x-ray photography and then counts the vertical sync pulses V as time information. The numerical values of the time counter 15, which correspond to a time scale, are supplied to the color converter 14, which selects an image color in dependence on these numerical values that may be red, orange, yellow, green turquoise or blue, for example. This selected image color is modulated with the difference signal of the subtractor stage 13 to prdouce a black and white (monochrome) intensity image. The color converter 14 converts these image colors into their primary colors red, green and blue, and their intensities are stored in the memories 16 to 18. An intensity image with the image color yellow, for example, produces an intensity image in each of the primary colors red and green. These intensity images in the primary colors are stored and accumulated, superimposed by summation, in the memories 16 to 18, so that after the completion of the x-ray photography the output signals of the image memories 16 to 18 produce a color subtraction image on the color video monitor 7. This color image facilitates recognition of the chronological progression of the contrast medium by the color of the image points. Thus this color subtraction image consists of different image colors in the integrated difference images during the entire progression of the contrast medium.

As shown in FIG. 2 in broken lines, quantum noise may be largely eliminated from the actual image by providing a second integration stage 22 and a second image memory 23 between the selection switch contact 10 and the difference stage 13. This integration can be obtained through a variable number of images, thereby suitably matching the rate of change in the contrast medium flow.

Instead of the memories 16 to 18 operating by summation (i.e., by accumulation) standard memories may be used, if these are preceded by one addition stage each, which has the output signal of the respective memory 16 to 18 fed back into its respective second inputs. Recursive filter circuits may also be used in place of the integration stages and the addition stages.

There has thus been shown and described a novel x-ray diagnositc apparatus which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention which is limited only by the claim which follows.

We claim:

1. In x-ray diagnostic apparatus comprising a video camera for producing a video signal representing an x-ray image of a subject; an image memory for storing said video signal; a subtraction stage coupled to the output of said image memory for producing a difference signal representing the difference between the stored video signal and another video signal chronologically following the stored signal; an evaluation circuit, including a time stage and a color converter, for time evaluation of said difference signal; and a video monitor coupled to said evaluation circuit; the improvement wherein said color converter is directly connected to the subtraction stage and converts a subtraction image represented by said difference signal into a monochrome intensity image whose image color is controlled by said time state in dependence upon the chronological occurrence of the subtraction image, said color converter having one output for each primary color and wherein one memory is coupled to each respective output of color converter for accumulating output signals of said color converter.

* * * * *